United States Patent [19]

Itou

[11] Patent Number: 4,814,194

[45] Date of Patent: Mar. 21, 1989

[54] PROCESS FOR PREPARING A FOOD PRODUCT HAVING A FOOD CONTENT AND A DOUGH FOR ENVELOPING THE FOOD CONTENT

[75] Inventor: Noriko Itou, Tokyo, Japan

[73] Assignee: Taiyo Fishery Co., Ltd., Tokyo, Japan

[21] Appl. No.: 153,528

[22] Filed: Feb. 3, 1988

Related U.S. Application Data

[63] Continuation of Ser. No. 838,727, Mar. 10, 1986, abandoned.

[51] Int. Cl.$^4$ .............................................. A21D 8/02
[52] U.S. Cl. ..................................... 426/549; 426/94; 426/95; 426/138; 426/139; 426/140
[58] Field of Search ............... 426/138, 139, 140, 549, 426/94, 95

[56] References Cited

U.S. PATENT DOCUMENTS

| | | | |
|---|---|---|---|
| 1,936,835 | 11/1933 | Fairchild | 426/138 |
| 2,890,958 | 6/1959 | Birnkrant | 426/139 |
| 3,410,691 | 11/1968 | Stanley | 426/138 |
| 3,615,684 | 10/1971 | Workin | 426/555 |
| 3,764,344 | 10/1973 | Glabe et al. | 426/138 |

FOREIGN PATENT DOCUMENTS 0055171  3/1984  Japan .................................. 426/140

*Primary Examiner*—Jeanette Hunter
*Attorney, Agent, or Firm*—Frank J. Jordan; C. Bruce Hamburg; Manabu Kanesaka

[57] ABSTRACT

A process for preparing a dough for enveloping food by mixing ground fish meat together with cereal flour powder and/or starch as well as oils and fats, and kneading the mixture to obtain a dough.

7 Claims, No Drawings

PROCESS FOR PREPARING A FOOD PRODUCT HAVING A FOOD CONTENT AND A DOUGH FOR ENVELOPING THE FOOD CONTENT

This application is a continuation, of application Ser. No. 838,727, filed Mar. 10, 1986, now abandoned.

BACKGROUND OF THE INVENTION (1) Field of the Invention

This invention relates to a process for preparing a food product having a dough for enveloping a food material such as preliminarily cooked food material.

(2) Description of the Prior Art

Recently there is a sign of fashion that fast food shops supply or serve snack food products prepared by filling an ingredient such as cooked gratin, doria, pilaf, meat sauce, cream croquette or the like into an edible container.

Alternately frozen food products are produced by filling an ingredient such as preliminarily cooked gratin, doria, pilaf, meat sauce, cream croquette or the like into an edible container, followed by freezing. Since these frozen food products can be eaten easily after simply heated or oil-fried, its future development has been expected.

As a dough for edible containers used for snack food products or frozen food products in fast food shops, there have been conventionally used those prepared by kneading wheat flour or starch or the mixture thereof together with oils and fats.

However, the above mentioned conventional dough for edible containers has the following drawback.

(a) Since it is hard to extend, forming a thin layer is impossible. Further it is susceptible to cracking at a part where a food content (ingredient) is filled.

(b) An edible container obtained by baking the dough is fragile and infusible in mouth.

(c) When a frozen food product is obtained by filling a food content (ingredient) into the dough or into an edible container prepared therefrom and thereafter freezing, a successive treatment of freezing, thawing (defrosting) and reheating makes the edible container fragile and the taste and crispiness (crispy texture) thereof worse.

Accordingly a main object of the present invention is to provide a novel dough for edible containers which eliminates all of the above mentioned drawbacks of the conventional dough for edible containers.

Other objects and advantages of the invention will become apparent from the following description.

SUMMARY OF THE INVENTION

According to the present invention, the above mentioned objects are achieved by a process for preparing a dough for edible containers which comprises mixing ground fish meat together with cereal flour (powder) and/or starch as well as oils and fats, and kneading the mixture to obtain a dough for edible containers.

In other words, the above mentioned drawbacks of the conventional dough for edible containers can be solved by further adding ground fish meat, as is or after salted, into the conventional dough for edible containers prepared by kneading cereal flour (powder) and/or starch as well as oils and fats as main components.

In the present invention, the existence of the ground fish meat, as it is or after salted, in a dough for edible containers contributes to improvement in the extensibility and the elasticity of the obtained dough, whereby a food content (ingredient) can be safely enveloped thereinto without causing cracks or the like thereon. Further an edible container obtained by baking the dough is readily fusible in mouth and excellent in taste and crispiness. Furthermore the frozen dough retains its easy fusibility in mouth and excellent taste and crispiness even after defrosted and reheated.

DETAILED DESCRIPTION OF THE PREFERRED EMBODIMENT

As the ground fish meat which is added into a dough for edible containers, there are exemplified (i) ground white fish meats such as walleye pollack (Alaska pollack), sharp-toothed eel, croaker, lazard fish and hair tail and (ii) ground lean fish meats such as horse mackerel, mackerel and sardine. These ground fish meats are used as it is or after salted.

In the present invention, a proportion of the ground fish meat may vary depending on the kind of a food material (ingredient) to be filled into an edible container or other factors, but is generally preferred to be 1 to 30% based on the weight of the dough for edible containers. The reason is because when it is less than 1%, it becomes difficult to obtain an effect of improving the extensibility of the dough, and when it exceeds 30%, an edible container prepared by baking the dough has slightly unfavorable fusibility in mouth and crispiness as well as some fish odor. The proportion of the ground fish meat is particularly preferred to be 5 to 10% based on the weight of the dough for edible containers.

In order to introduce the ground fish meat into the dough for edible containers, the following methods are used.

(i) The ground fish meat as it is or after salted is added into the mixture or blend comprising cereal flour (powder) and/or starch as well as oils and fats as main components, and thereafter the whole mixture is kneaded.

(ii) The mixture or blend comprising cereal flour (powder) and/or starch as well as oils and fats as main components is added into the ground fish meat as it is or after salted, and thereafter the whole mixture is kneaded.

As the cereal flour (powder) which is a main component for the dough, there can be used any kind of edible cereal flours (powders) including wheat strong flour, wheat soft flour and rye flour. Particularly preferred are wheat strong flour and wheat soft flour. As the starch, there can be used any kind of edible starches. Particularly preferred is corn starch. As mentioned above, the cereal flour (powder) and the starch can be used singly or in combination. A proportion of the cereal flour (powder) and/or starch based on the weight of the dough is preferably 10 to 60%, most preferably 40 to 45%.

As the oils and fats used with the cereal flour (powder) and/or starch, there are exemplified solid shortening, margarine and foamed oils and fats. However, the oils and fats used in the present invention are not limited thereto. A proportion of the oils and fats based on the weight of the dough is preferably 20 to 70%, more preferably 20 to 25%.

The dough for edible containers may further contain baking powder or yeast powder, table salt, sweetener, milk, spice, seasoning, food additive and the like.

The present invention will be further explained referring to non-limitative Example and Comparative Example as well as Application Examples. In these examples, "parts" means parts by weight, otherwise stated.

EXAMPLE

Ground fish meat is used as it is. To 5 parts of the ground fish meat is added 1.5 parts of foamed oils and fats, and the mixture is agitated for 5 minutes.

To the mixture wherein the ground fish meat and foamed oils and fats have been uniformly distributed, there are added 21 parts of wheat strong flour, 13 parts of wheat soft flour, 0.5 part of table salt, 2.5 parts of sugar, 0.1 part of yeast powder, 25 parts of margarine as the oils and fats. 25 parts of milk, and the resulting mixture is agitated for 5 minutes. The ground fish meat contains 3 to 4 parts of water.

Then the mixture is kneaded to obtain a dough for edible containers.

Concerning the obtained dough for edible containers, the following items are observed.

The state of the dough obtained by kneading

The state of the dough after defrozen

The state of the dough after defrozen and reheated (including the taste and crispiness)

The results are shown in Table 1.

COMPARATIVE EXAMPLE

For comparison; a dough for edible containers is prepared without using ground fish meat. That is, the following components are mixed together and the mixture is kneaded to obtain the dough.

| wheat strong flour | 21 parts |
|---|---|
| wheat soft flour | 13 |
| table salt | 0.5 |
| margarine as oils and fats | 25 |
| sugar | 2.5 |
| yeast powder | 0.1 |
| milk | 28 |

The same items as in Example are observed. The results are shown in Table 1.

TABLE 1

| | | Example (with ground fish meat) | Comparative Example (without ground fish meat) |
|---|---|---|---|
| State of the dough obtained by kneading | extensibility | good (slightly sticky after kneading, but extensible and easily punchable after cooling at 5° C.) | bad (less sticky after kneading, but breaks when extended. more difficult to extend and liable to break after cooling at 5° C.) |
| | elasticity | good when enveloping a food material, the dough expands and does not break at a part where the food material is contained. The adhesiveness of the dough is good.) | bad (when enveloping a food material, the dough is liable to break at a part where the food material is contained. Especially the dough cracks when the circumferential ends thereof are pasted together.) |
| | skin texture | shows a fine and creamy state | shows a coarse state |
| State of the dough after baked (baking condition: heating in an oven of 170~200° C. for 15~20 minutes) | | when the dough containing a food material is baked, it inflates puffily. This inflation retained even after cooled. | the dough does not inflate and has a poor outward appearance. |
| State of the dough after frozen (freezing condition: −18~−40° C.) | | resistant to freezing and retains its strength after frozen | becomes brittle after frozen |
| State of the dough after defrosted and reheated (reheating condition: heating in an electronic range for 30 seconds after defrosted | outward appearance | good (retains a good color and gloss which the dough has when it is taken out from an oven. When overheated, the dough inflates but does not puncture.) | bad (has a bad outward appearance and cracks and punctures when overheated.) |
| | taste and crispiness (the taste results by 16 panelers are collectively shown) | good (fusible in mouth, smooth and less tacky. has the same taste and crispiness as before frozen. The reheated product maintains good taste and crispiness after cooled.) | bad (infusible in mouth and sticky. clearly inferior to the product before frozen in taste and crispiness.) |
| | miscellaneous | when cut with a knife, a cut end is linear and sharp. | when cut with a knife, a cut end is tattered and dull. |

As is clear from Table 1, the dough for edible containers obtained in Example is superior to the conventional dough for edible containers obtained in Comparative Example in all the items of the state of the dough obtained by kneading, the state thereof after frozen and the state thereof after defrozen and reheated.

Hereinunder are explained Application Examples for producing snack food products and frozen food products using the dough for edible containers prepared according to the present invention.

APPLICATION EXAMPLE 1

The dough for edible containers obtained in Example mentioned above is extended in a thickness of about 1.5 mm and thereafter punched to obtain disks each having a diameter of about 100 mm and a weight of about 20 g.

Between a pair of disks obtained above is put about 40 g of gratin consisting of the following formulation.

| Formulation of gratin | |
|---|---|
| milk | 53.0 parts |
| oils and fats | 5.5 |
| wheat flour | 5.3 |
| macaroni | 10.2 |
| onion | 6.5 |
| crab meat | 18.0 |
| seasoning | 1.5 |

After the circumferential ends of the disks are pasted together with the yolk, the gratin-containing disks are heat-baked in an oven of about 200° C. for about 20 minutes to obtain a gratin-containing snack food product.

Since the snack food product has an infragile edible container and is easily fusible in mouth, it is superior in taste and crispiness to a snack food product wherein the conventional edible container is used.

APPLICATION EXAMPLE 2

A doria-containing snack food product is obtained in the same manner as in Application Example 1 except that about 40 g of doria consisting of the following formulation is used instead of the gratin.

| | Formulation of doria | |
|---|---|---|
| (1) | white sauce | 70 parts |
| | milk | 53.0% by weight |
| | oils and fats | 5.5 |
| | wheat flour | 5.3 |
| | macaroni | 10.2 |
| | shrimp or prawn | 18.0 |
| | onion | 6.5 |
| | seasoning | 1.5 |
| (2) | pilaf | 30.0 parts |
| | rice | 39.0% by weight |
| | onion | 8.0 |
| | bouillon | 42.0 |
| | oils and fats | 4.0 |
| | seasoning | 7.0 |

Like the snack food product of Application Example 1, the snack food product has excellent taste and crispiness.

APPLICATION EXAMPLE 3

A tuna salad-containing snack food product is obtained in the same manner as Application Example 1 or 2 except that about 40 g of tuna salad consisting of the following formulation is used instead of the gratin or doria.

| Formulation of tuna salad | |
|---|---|
| tuna | 40.0 parts |
| onion | 40.0 |
| pepper | 3.3 |
| spice | 0.2 |
| wheat flour | 7.0 |
| dressing | 9.0 |
| seasoning | 0.5 |

Like the snack food product of Application Example 1 or 2, the snack food product has excellent taste and crispiness.

APPLICATION EXAMPLE 4

The same dough for edible containers as used in Application Example 1 is made into the same shape as in a corn cup for soft ice cream, and thereafter it is baked to obtain an edible container, into which is filled 100 g of gratin ingredients consisting of the following formulation so that the upper portion thereof becomes protuberant in a globular shape.

| Formulation of gratin | |
|---|---|
| white sauce | 100 parts |
| macaroni | 20 |
| peeled and boiled shrimp or prawn meat | 13 |
| finely cut and oil-frizzled onion | 10 |

After rapidly freezing the gratin-containing edible container at −40° C., the surface of the gratin exposed out of the container is twice coated with a coating prepared from wheat flour, vegetable protein and cooled water, onto which fine bread crumb having a size of 12 mesh is applied. Thereafter the gratin-containing edible container is frozen again to obtain a frozen food product for frying.

Prior to serving, the frozen food product obtained above is heated in an edible oil of 170° C. for 5 minutes. By said heating, heat reaches the central portion of the gratin and simultaneously the edible container is fried in the edible oil to give an appetizing fried food product having crispiness and nice smell.

APPLICATION EXAMPLE 5

Between a pair of the same dough disks as used in Application Example 1 is put gratin ingredient consisting of the following formulation and the circumferential ends of the disks are pasted together with the yolk.

| Formulation of gratin | |
|---|---|
| white sauce | 100 parts |
| macaroni | 20 |
| peeled and boiled shrimp or prawn meat | 13 |
| finely cut and oil-frizzled onion | 10 |

The obtained gratin-containing doughs are rapidly frozen at −40° C. to obtain a frozen food product.

Prior to serving, the frozen food product is defrosted and heated in an electronic range to obtain a food product excellent in taste and crispiness.

The above mentioned Application Examples 1-5 are examples wherein the dough for edible containers obtained according to the present invention is used for the production of snack food products and frozen food products. However the application of the dough for edible containers obtained by the present invention is not limited thereto and it can be used for enveloping candies, ice cream or the like thereinto or preparing gyoza (a Chinese food product prepared by enveloping a galic-containing ingredient into a flat disk of dough).

What is claimed is:

1. A process for preparing a food product, comprising:
   mixing 1–30% by weight of ground fish meat, 10–60% by weight of at least one of cereal flour and starch, and 20–70% by weight of oil materials,
   kneading the mixture and forming a dough for edible containers, and
   enveloping a food content by the dough, when the food content is enveloped, forming no cracks due to elasticity and extensibility of the dough.

2. A process according to claim 1, further comprising adding, while mixing, at least one of baking powder, yeast powder, table powder, table salt, sweetener, milk, spice and seasoning.

3. A process according to claim 2, wherein the oil materials are oils and fats.

4. A process according to claim 3, wherein the ground fish meat is at least one of ground white fish meat and ground lean fish meat.

5. A process according to claim 1, further comprising cooking the dough with the food content, whereby the dough inflates moderately.

6. A process according to claim 1, further comprising freezing the dough with the food content, and defrosting and cooking the dough with the food content when served, whereby the appearance and taste of the dough with the food content after defrosting and cooking are substantially the same as those without freezing.

7. A process according to claim 1, wherein the food materials to be enveloped by the dough are gratin, doria, pilaf, meat sauce and cream croquette.

* * * * *